April 9, 1957  H. M. CROW  2,788,231
CONDUIT COUPLING HAVING INTERNAL FLUID EXPANSIBLE SEAL
Filed July 3, 1953

HOWARD M. CROW
INVENTOR
HUEBNER, BEEHLER,
WORREL & HERZIG
ATTORNEYS

United States Patent Office 2,788,231
Patented Apr. 9, 1957

2,788,231

CONDUIT COUPLING HAVING INTERNAL FLUID EXPANSIBLE SEAL

Howard M. Crow, Lindsay, Calif.

Application July 3, 1953, Serial No. 365,923

4 Claims. (Cl. 285—107)

The present invention relates to conduit couplings and more particularly to such a coupling adapted for speedy connection and disconnection of associated conduits, such as portable irrigation pipes, garden hoses and faucets therefor, and the like.

The joining of adjacent ends of conduits by other than screw-threaded fittings has long been known but has been subject to numerous difficulties which the present invention seeks to overcome. Such "field joint" couplings are usually subject to undesirable leakage. Those that appear to be satisfactory under a given fluid pressure often provide almost no sealing action at other pressures. For example, it is not unusual for certain types of field joint couplings to preclude leakage at high pressures but to leak excessively at low pressures. Also, many field joint couplings are easy to install but difficult or impossible to release without damage thereto.

Typical of popular conventional field joint couplings is the "pipe joint" shown in the patent to Pierce, No. 1,945,293. Such couplings provide "cup-rubbers" molded to provide an annular, transversely triangular, cup adapted to receive water or other fluid under pressure. At each side of the cup is a resilient lip. An outer lip is intended to expand against an outer pipe sleeve and an inner lip is intended to expand inwardly against an inner pipe incident to pressure within the cup. Although the Pierce pipe joint and couplings similar thereto have been popular for certain uses, they have certain disadvantages limiting their full usefulness. The described two-way expansion of the cup-rubbers is not always effective in precluding leakage. During interconnection of the pipes, one of the lips must slidably engage a pipe associated therewith while the other lip is held against a pipe sleeve previously fitted thereto. Such initial contact and slidable engagement has been considered necessary for even partial sealing at low pressures. The lip in slidable engagement with the pipe is usually extended in the direction of pipe movement during telescopic association to minimize abrasions and distortion thereof. Subsequent to use, if it is desired to disassociate the pipe from the coupling, the slidable removal of the pipe tends to roll the lip outwardly relative to its respective cup which usually precludes disassociation of the pipe without damage or destruction to the cup-rubber. Further, such couplings require the fabrication of a plurality of separate and distinct elements and their assembly prior to use. This has been found to be productive of needless expense and inconvenience. Such couplings must be internally examined when they are to be used to make certain that the cup-rubbers are all in place and suitable for use.

An object of the present invention is to provide an improved coupling of the field joint type.

Another object is to provide a quick release coupling effective in translating internal fluid pressures into effective sealing action.

Another object is to provide a coupling of the character described which is quickly and easily associated with pipes and disassociated therefrom with no substantial damage to itself or to the pipes.

Another object is to provide a quick release coupling that provides substantially uniformly effective sealing action throughout the range of pressures normally encountered in irrigation systems and the like.

Another object is to provide a coupling of unitary structure suitable for formation from elastic somewhat resiliently compressible material such as rubber or plastic.

Another object is to provide a coupling which is conveniently examined for operable condition by only brief external visual inspection.

Further objects are to provide improved elements, configurations, and arrangements thereof in a device of the character and for the purposes set forth that is simple to produce, economical and durable.

Other objects and advantages will become apparent in the subsequent description in the specification.

Figure 1:
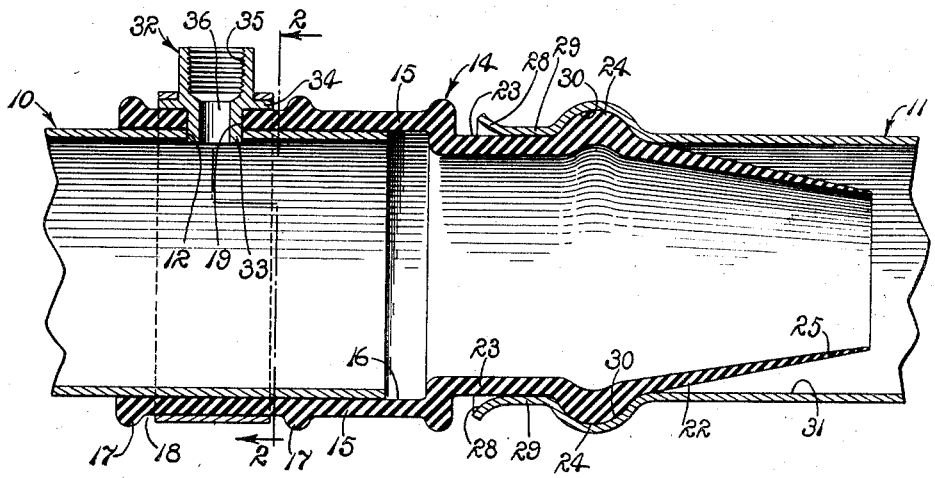
Fig. 1 is a longitudinal section of axially aligned conduits releasably interconnected in fluid tight association by a coupling embodying the principles of the present invention.

Referring to the drawing in greater detail:

A first conduit is indicated generally at 10 with which a second conduit 11 is desired to be connected in fluid tight axial alignment. For illustrative convenience, the conduits are shown as being of the same diameter. Once described, however, it will be apparent that the coupling of the present invention may be constructed so as to interconnect conduits or the like of different diameters. The first conduit 10 provides a radially disposed opening 12 therein adjacent to an end thereof.

The coupling 14 embodying the principles of the present invention is of integral construction and formed of an elastic somewhat resiliently compressible material, such as rubber, plastic or the like. The coupling provides a female portion 15 having a substantially cylindrical inner surface 16 slidably fitted to the end of the first conduit 10. The female portion is circumscribed by a plurality of annular ribs 17 defining a clamp receiving channel 18 therebetween having an opening 19 radially therethrough aligned with the opening 12.

A tubular male portion 22 is axially extended concentrically from the female portion. The male portion includes a substantially cylindrical thimble 23 of an external diameter substantially equal to the internal diameter of the conduit 11. An annular bead 24 having an outwardly disposed convex surface approximating but less than semicircular in section longitudinally of the coupling and an inwardly disposed concave surface is formed at the extended end of the thimble 23. A frusto-conical seal 25 has an end of major diameter substantially the same as the diameter of the thimble which is integral with the bead and is endwardly extended therefrom substantially concentrically thereto. The seal consists of an elongated tapered wall of progressively decreased thickness and increased elasticity from the bead to its extended end.

The end of the second conduit 11 is flared, as at 28, to facilitate slidable movement of the end of the second conduit over the seal 25, bead 24 and thimble 23. A cylindrical portion 29 of the second conduit is slidably fitted to the periphery of the thimble 23 and the conduit is swaged, spun or otherwise formed to provide an annular pocket 30 adjacent thereto fitted to the peripheral surface of the bead 24. A further cylindrical portion 31 is axially extended from the bead.

A fitting 32 provides a stem 33 extended through the openings 19 and 12, a radially extended flange 34 overlying the periphery of the coupling in the channel 18, and a screw-threaded socket 35 outwardly extended from the flange. The fitting provides a bore 36 therethrough for the emission of water or other fluid conducted through the conduit. A sprinkler, additional fitting, plug, or the like, not shown, may be mounted in the socket 35 as convenience suggests.

A strap-clamp 38 is mounted in circumscribing relation on the female portion 15 in the channel 18 and overlays the flange 34. The clamp provides any suitable means 39 for releasably constricting the clamp in position so as to tighten the female portion 15 of the coupling against the first conduit 10. The constricting action of the clamp also serves to compress the flange 34 of the fitting 32 into fluid tight engagement with the coupling member which may or may not be recessed into the bottom of the channel 18, as preferred.

Operation

Figure 2:
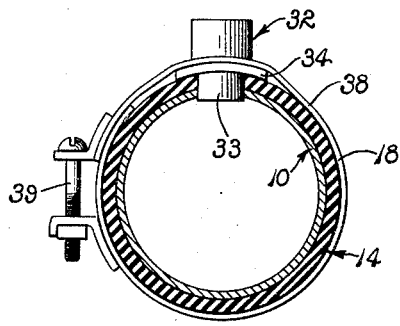
Fig. 2 is a transverse section of the coupling taken at a position represented by the line 2—2 of Fig. 1.
Figure 3:
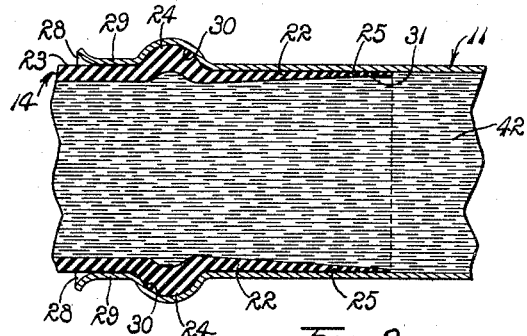
Fig. 3 is a fragmentary section similar to the section of Fig. 1 but showing a male portion of the coupling in sealing position as assumed when subjected to internal fluid pressure.

The operation of the form of the invention shown in Figs. 1, 2 and 3 is believed to be clearly apparent and is briefly summarized at this point. With the female portion 15 of the coupling 14 mounted on the first conduit 10 in the manner described, the male portion 22 is conveniently disposed for connection of the second conduit 11 thereto. To effect such connection, the flared end 28 of the second conduit is slid over the male portion until the annular pocket 30 is fitted over the head 24. This operation is quickly and easily performed even when the conduits are of substantial size. Even with substantially no fluid pressure exerted outwardly on the coupling member, the engagement of the bead in the pocket attains a satisfactory initial sealing effect.

When water 42, or other fluid under pressure is directed through the conduits 10 and 11, the seal expands outwardly against the cylindrical portion 31 of the second conduit 11, as shown in Fig. 3. Not only does such expansion press the seal into fluid tight engagement with the interior of the second conduit but such expansion exercises a uniquely beneficial effect on the bead 24 enhancing the sealing action thereof. The end portion of the frusto-conical seal connected to the bead 24 is substantially rigid longitudinally of the coupling member and said seal is of progressively increased elasticity in endward progression away from the bead. As the seal expands, the portions thereof adjacent to the bead exercise a levering effect on the bead tending to roll the bead outwardly relative to the thimble 23. The tendency of the bead to roll outwardly compresses the peripheral surface of the bead tightly into the pocket 30.

When it is desired to disconnect the second conduit 11 from the first conduit 10, the supply of water or other fluid under pressure to the conduits is discontinued, the male end portion 22 returns to the condition shown in Fig. 1, and the second conduit is simply drawn axially from the male end portion 22 of the coupling 14. It will be observed that the seal 25 is not damaged in any way by the connecting or disconnecting operations being contracted from conduit engagement. This is in direct contrast with the inner lips of the cup-rubbers of the conventional field joints described which are frequently damaged by the disconnecting operation.

Not only does the fitting 32 provide a mounting means for a sprinkler, not shown, or the like, but the stem 33 thereof extends through the openings 12 and 19 and precludes axial shifting of the coupling 14 during mounting or removal of the second conduit from the male portion 22. While the fitting is a useful adjunct to the present invention, particularly in field irrigation systems, it is obviously not essential to the operation of the coupling and may be omitted, in which event the openings 12 and 19 are likewise omitted.

Removal of the coupling 14 from the first conduit 10 is conveniently accomplished, when desired, by releasing the clamp 38, lifting the fitting 32 from the openings 12 and 19, and sliding the female portion 15 from the conduit. The coupling is as conveniently mounted on another conduit fitted to the female portion 15. The coupling is economical to construct, easy to install, and durable. Its connecting and disconnecting operations are speedily and easily accomplished with no appreciable damage thereto. In use, it has proved capable of effectively precluding leakage during all normally encountered fluid pressures where conventional release couplings are utilized.

Second form

Figure 4:
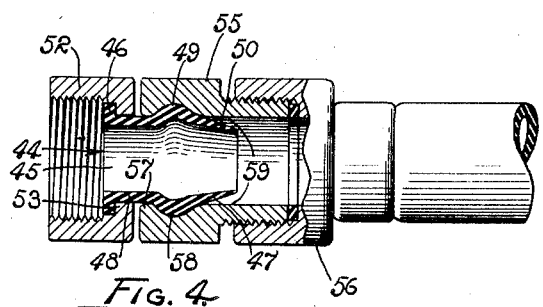
Fig. 4 is a longitudinal section of a second form of the present invention.

A second form of the invention is illustrated in Fig. 4 wherein a coupling embodying the principles of the present invention is indicated at 44. The coupling provides a substantially cylindrical mounting end portion 45 having a peripherally disposed flange 46. A male end portion 47 similar to the male end portion 22, described, is provided integrally with the mounting end portion 45. The male end portion provides a cylindrical thimble 48, bead 49 and frusto-conical seal 50 similar to the thimble 23, bead 24 and seal 25.

A first conduit element 52 in the form of a union, is rotatably mounted on the mounting end portion 45 and provides an inturned flange 53 compressible against the flange 46. The first conduit may be screw-threadedly mounted on a faucet or other suitable source of fluid under pressure, not shown.

A second conduit element 55 conveniently takes the form of a union having a garden hose 56 or the like connected thereto. Like the conduit 11, the conduit element 55 provides a flared end 57 fitted to the thimble 48, an annular pocket 58 fitted to the bead 49 and a cylindrical portion 59 circumjacent to the seal 50.

The coupling 44 is mounted on any desired source of fluid, in fluid tight association therewith, by tightening the first conduit element 52 thereon. So mounted, the male end portion 47 is conveniently disposed for connection and disconnection. For example, in order to connect the hose 56 thereto, the second conduit element 55 is thrust endwardly over the male end portion 47, as shown in Fig. 4. When fluid pressure is exerted internally on the seal 50, it expands outwardly against the cylindrical portion 59 in the manner described for the seal 25, illustrated in Fig. 3, and the bead 49 tends to roll outwardly relative to the thimble 48 into increased sealing engagement in the annular pocket 58.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. The combination of a conduit; a unitary coupling member of elastic somewhat resiliently compressible and flexible material having a female mounting end portion providing a substantially cylindrical inwardly disposed surface slidably fitted over the conduit, and outwardly disposed annular circumscribing ribs defining a clamp receiving channel therebetween, said coupling member having a tubular male end portion providing a substantially cylindrical thimble integral with the female end portion and axially extended therefrom, an annular bead having an outwardly disposed convex surface approximating, but less than, semicircular in section longitudinally of the coupling and an inwardly disposed concave surface integral with the thimble and extended therefrom, and an elongated distendible seal integral with the annular bead having frusto-conical inner and outer surfaces endwardly constricted from the bead and of progressively decreased thickness and increased elasticity from the bead to the extended end of the seal; a clamp mounted in the channel defined by the ribs of the female portion of the elastic member constricting said portion into fluid tight engagement on the conduit; and a second conduit having a cylindrical portion providing a flared end fitted over the thimble of the male end portion of the member, an annular pocket fitted outwardly over the bead of the male end portion of the member, and a cylindrical portion integral with the pocket circumjacent to the seal, said seal in the absence of pressure thereagainst being spaced from the second conduit throughout substantially the entire length of the seal and being expansible outwardly against the cylindrical portion of the second conduit by imposition of fluid pressure internally thereon, said expansion by the seal exercising a leverage action on the bead thereby urging the bead outwardly into increased compression against the annular pocket.

2. The combination of a conduit having a radially disposed opening adjacent to an end thereof; a coupling member of elastic somewhat resiliently compressible and flexible material having a female mounting end portion providing a substantially cylindrically inwardly disposed surface fitted over the end of the conduit, and outwardly disposed annular circumscribing ribs defining a clamp receiving channel therebetween, the coupling member having an opening radially through the female portion thereof aligned with the opening in the conduit, and a tubular male end portion providing a substantially cylindrical thimble integral with the female end portion and axially extended therefrom, an annular bead integral with the thimble and axially extended therefrom having an outwardly disposed convex surface approximating but less than semicircular in section longitudinally of the coupling member and an inwardly disposed concave surface, and an elongated seal having an end portion of maximum diameter integral with the annular bead and having frusto-conical inner and outer surfaces and being of progresssively decreased thickness and increased elasticity endwardly from the bead; a second conduit having an outwardly flared end portion fitted over the thimble of the coupling member, an annular inwardly concave pocket complementarily fitted over the convex surface of the bead of the coupling member, and a substantially cylindrical portion circumjacent to the seal; a fitting extended through the aligned openings in the coupling and the first conduit and having a flange outwardly overlaying the female portion of the coupling member, and a socket in fluid communication with the interior of the first conduit outwardly extended from the flange; and a strap-clamp having an opening therein fitted over the socket of the fitting in overlaying relation to the flange thereof tensioned in circumscribing relation on the female portion of the coupling member, the seal of the coupling member normally being in spaced relation to the second conduit throughout substantially the entire length of the seal and being expansible outwardly forming a substantially cylindrical extension of the thimble in sealing engagement against the cylindrical portion of the second conduit by imposition of fluid pressure internally thereon and the end portion of the seal of maximum diameter being substantially rigid longitudinally thereof whereby expansion of the seal tends to roll the bead outwardly relative to the thimble into increased compression against the pocket.

3. A coupling member of elastic resiliently flexible material adapted to interconnect a fluid conducting member and an elongated substantially cylindrical conduit having a transverse internally disposed concave pocket in circumscribing relation to the conduit comprising a substantially cylindrical end portion having a central longitudinal axis and adapted to receive and be secured to the fluid conducting member, and a male end portion adapted for releasable slidable insertion and removal into and from the conduit providing a substantially cylindrical thimble integral with the female end portion and axially extended from the female end portion, an annular bead circumscribing the male end portion integral with the thimble having an outer rounded convex surface adapted for rolling engagement with the internal concave surface of the pocket of the conduit and an internal substantially concentric concave surface, and an elongated frusto-conical sealing wall integral with the bead having inner and outer frusto-conical surfaces axially convergently endwardly extended from an inner end of maximum diameter at the bead where it is substantially rigid longitudinally of the coupling member to a terminal end of minimum diameter and of progressively decreased thickness from the inner end to the terminal end adapted normally to be in spaced relation to the conduit but distendible outwardly into sealing engagement with the conduit incident to imposition of fluid pressure thereon thereby to leverage the bead rollably into sealing engagement in the pocket.

4. In combination with a substantially rigid cylindrical conduit having an annular concave pocket and having a substantially cylindrical end portion; a coupling member of elastic resiliently flexible and compressible material comprising a substantially cylindrical female mounting end portion; and an elongated tubular male end portion fitted in the conduit and being slidably insertable into and removable from the conduit incident to imposition of opposite axial thrusts on the coupling member relative to the conduit providing a substantially cylindrical thimble axially extended from the mounting end portion within the cylindrical end portion of the conduit, an outwardly bulged bead of predetermined transverse diameter circumscribing the male end portion integrally axially extended from the thimble having an outer convex surface complementary to the internal concave surface of the pocket of the conduit fitted in the pocket for inward and outward rolling engagement against said surface of the pocket and having an inner concave surface of substantially the same curvature as the outer surface of the bead, and an elongated distendible sealing wall having inner and outer endwardly tapered frusto-conical surfaces integrally axially extended from the bead where it is substantially rigid longitudinally of the coupling member within the conduit to a terminal end of a diameter less than the diameter of the bead having a progressively decreasing thickness and increasing elasticity from the bead to the terminal end movable by imposition of hydrostatic pressure thereagainst from an inner normally relaxed position spaced from the conduit to an outer distended position held in fluid tight engagement with the conduit wherein the bead is leveraged in outward rolling engagement tightly into the pocket of the conduit by said distending of the wall.

References Cited in the file of this patent

UNITED STATES PATENTS

| 562,963 | Horner | June 30, 1896 |
|---|---|---|
| 999,167 | Jones | July 25, 1911 |
| 1,843,191 | Balze | Feb. 2, 1932 |
| 1,988,198 | German | Jan. 15, 1935 |
| 2,090,719 | Alt | Aug. 24, 1937 |
| 2,142,452 | Merrill | Jan. 3, 1939 |
| 2,202,459 | Link | May 28, 1940 |
| 2,245,154 | McWane | June 10, 1941 |
| 2,366,814 | Smith | Jan. 9, 1945 |
| 2,392,085 | Ferrel | Jan. 1, 1946 |
| 2,529,098 | Noll | Nov. 7, 1950 |
| 2,583,694 | Fulton | Jan. 27, 1952 |
| 2,703,721 | Montgomery | Mar. 8, 1955 |

FOREIGN PATENTS

| 123,373 | Great Britain | Feb. 17, 1919 |
|---|---|---|
| 166,390 | Great Britain | July 21, 1921 |